United States Patent [19]

Douglas et al.

[11] Patent Number: 4,604,265

[45] Date of Patent: Aug. 5, 1986

[54] RECOVERY OF TUNGSTEN AND RHENIUM

[75] Inventors: Alan D. Douglas; Kenneth T. Reilly, both of Towanda; John E. Landmesser, Monroeton; Richard E. Landry; Martin B. MacInnis, both of Towanda, all of Pa.

[73] Assignee: GTE Products Corporation, Stamford, Conn.

[21] Appl. No.: 768,388

[22] Filed: Aug. 22, 1985

[51] Int. Cl.$^4$ ...................... C01G 41/02; C01G 47/00
[52] U.S. Cl. .......................................... 423/49; 423/53; 423/59
[58] Field of Search ..................................... 423/49, 59

[56] References Cited

U.S. PATENT DOCUMENTS 2,579,107  12/1951  Bertolus .................................. 423/49
3,798,306  3/1974  Lapat et al. ............................. 423/49

Primary Examiner—H. T. Carter
Attorney, Agent, or Firm—Donald R. Castle; L. Riti Quatrini

[57] ABSTRACT

A process is disclosed for recovering tungsten and rhenium from a tungsten and rhenium source. The process involves firing the source in an oxidizing atmosphere at a sufficient temperature for a sufficient time to convert the tungsten and rhenium to their respective oxides, to remove a portion of the rhenium as volatilized oxide, and to form a first fired material containing essentially all of the tungsten and the remaining portion of the rhenium, increasing the surface area of the resulting oxidized tungsten, and firing the first fired material in an oxidizing atmosphere at a sufficient temperature for a sufficient time to remove essentially all of the remaining portion of the rhenium as volatilized oxidized rhenium and to form an essentially rhenium-free oxidized tungsten.

8 Claims, No Drawings

RECOVERY OF TUNGSTEN AND RHENIUM

BACKGROUND OF THE INVENTION

This invention relates to a process for recovering tungsten and rhenium from tungsten and rhenium bearing material. More particularly it relates to a process for recovering tungsten and rhenium from tungsten and rhenium bearing material by increasing the surface area of oxidized tungsten followed by volatilizing the rhenium.

In the processing of tungsten and rhenium bearing material such as tungsten-rhenium wire, it is economically advantageous to reprocess the scrap material to efficiently recover the tunsten and rhenium separately.

Prior to this invention, attempts to do this have been essentially unsuccessful.

Therefore a process to efficiently recover both rhenium and tungsten from tungsten-rhenium material would be an advancement in the art.

SUMMARY OF THE INVENTION

In accordance with one aspect of this invention there is provided a process for recovering tungsten and rhenium from a tungsten and rhenium bearing source. The process involves firing the source in an oxidizing atmosphere at a sufficient temperature for a sufficient time to convert the tungsten and rhenium to their respective oxides, to remove a portion of the rhenium as volatilized oxide, and to form a first fired material containing essentially all of the tungsten and the remaining portion of the rhenium, increasing the surface area of the resulting oxidized tungsten, and firing the first fired material in an oxidizing atmosphere at a sufficient temperature for a sufficient time to remove essentially all of the remaining portion of the rhenium as volatilized oxidized rhenium and to form an essentially rhenium-free oxidized tungsten.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The tungsten and rhenium bearing source of this invention can be any type of material. The invention is particularly applicable to tungsten-rhenium metal in the form of wire.

Most typically the source contains from about 1 to about 10 weight percent rhenium with the balance being tungsten.

The tungsten-rhenium source is first fired in an oxidizing atmosphere which is preferably air or oxygen at a sufficient temperature for a sufficient time to convert the tungsten and rhenium to their respective oxides, to remove a portion of the rhenium as volatilized oxide by sublimation, and to form a first fired material containing essentially all of the tungsten and the remaining portion of the rhenium.

The firing temperature is generally from about 650° C. to about 1100° C. with from about 700° C. to about 900° C. being preferred. The firing time is generally from about 4 hours to about 72 hours with from about 16 hours to about 30 hours being preferred. The firing time depends on the temperature, so that the higher the temperature the shorter the firing time. For example, preferably firing conditions are for about 30 hours at abut 800° C. and about 16 hours at about 900° C. Since having an oxidizing atmosphere is important, the furnace is preferably an electric furnace rather than a gas fired furnace.

The first firing step converts essentially all of the tungsten and rhenium to their respective oxides, in particular to tungstic oxide and rhenium heptoxide. Typically at least about 98% by weight of the tungsten and at least about 98% of the rhenium are converted to the oxidized form.

Although rhenium heptoxide normally sublimes at the given firing temperatures and therefore it may be expected that a separation of the tungsten and rhenium would take place in this step, only a portion of the rhenium is sublimed off. For example, the oxidized tungsten generally contains about 1% by weight rhenium when the source contains initially about 3% by weight rhenium.

The inability of the rhenium oxide to sublime off is believed to be due to the fact that the tungsten oxide which forms in this firing step has a surface area of from about 0.2 to about 0.5 $m^2/g$ which is a relatively large particle size, and that the rhenium oxide is trapped within these particles and held tightly enough so that its normal vapor pressure is not realized. As a result, the rhenium does not sublime out of the tungsten oxide particles.

Therefore, in order to make the rhenium oxide free to sublime off, the surface area of the tungsten oxide is increased, or, in other words, the particle size of the tungsten oxide is reduced.

This can be done by any number of known methods and it is to be understood that any method of reducing the particle size of the tungsten oxide will not depart from the scope of this invention.

Some methods of reducing the particle size of the tungsten oxide are by wet ball milling, vibratory impact milling, vibration energy milling, attritor milling, air jet milling, and hammermilling. The first two named methods are the most preferred.

By the wet ball milling method, the tungsten oxide is weighed and charged to a clean mill. A quantity of water equal to about 45% of the weight of the tungsten oxide is also added to the mill. The mill is then sealed tightly and rotated for a period of time that is at least about 24 hours but no longer than about 120 hours, depending on the size of the charge of tungsten oxide in the mill, and the temperature at which the tungsten oxide was formed in the first firing step. The higher the temperature is above about 700° C., the longer the ball milling time required for good release of the rhenium that is trapped therein.

After the period of ball mill rotation, the mill is opened and the mixture of balls and the tungsten oxide slurry is poured onto a coarse screen to retain the balls. Both the mill and the balls are rinsed with water to remove all the tungsten oxide. The slurry is then filtered using a very retentive filter paper to retain as much of the fines as possible.

The surface area of the resulting reduced particle size tungsten oxide is generally from about 7 to about 14 $m^2/g$.

The increased surface area tungsten oxide is then either dried and broken up and refired, or is charged to a furnace and directly refired in an oxidizing atmosphere which is preferably air or oxygen at a sufficient temperature for a sufficient time to remove essentially all of the the remaining portion of the rhenium as volatilized oxidized rhenium and to form an essentially rheniun-free oxidized tungsten.

Typically firing temperatures are from about 700° C. to about 1100° C. with from about 800° C. to about 1000° C. being preferred. Firing times are typically from about 4 hours to about 48 hours with from about 24 hours to about 30 hours being preferred. The firing time depends on the temperature with the time being shorter at the higher temperatures.

The rhenium oxide having been released from the tungsten oxide particles, now sublimes, and essentially rhenium-free tungsten oxide remains. Generally the tungstic oxide is about 99% pure with respect to rhenium.

The sublimed rhenium can be recovered and processed by conventional methods.

To more fully illustrate this invention, the following nonlimiting examples are presented. All parts, portions, and percentages are on a weight basis unless otherwise stated.

EXAMPLE 1

About 100.75 parts of tungsten-rhenium wire containing about 3.25% rhenium is fired for about 24 hours in flowing air at about 800° C. The first fired material contains about 0.79% Re and has a surface area of about 0.45 m$^2$/g. About 20.4 parts of this first fired material is milled in a vibratory impact mill for about 15 minutes to produce a material having a specific surface area of about 10.98 m$^2$/g. About 16.03 parts of the resulting milled material is then fired for about 24 hours in flowing air at about 900° C. The rhenium content of the resulting tungsten oxide is about 0.12%.

EXAMPLE 2

About 100 parts of the same wire of Example 1 is fired for about 4 hours in flowing air at about 900° C. The resulting fired material contains about 0.99% Re. and has a specific surface area of about 0.20 m$^2$/g. This first fired material is hammermilled twice to a surface area of about 0.81 m$^2$/g. It is then ball milled for about 136 hours to a surface area of about 8.49 m$^2$/g. About 25.4 parts of the milled material is fired for from about 20 to about 24 hours at about 900° C. in flowing air. The resulting second fired material has a rhenium content of about 0.27%.

EXAMPLE 3

About 55.2 parts of tungsten-rhenium wire of the same type as used in Examples 1 and 2 is fired for about 88 hours at about 700° C. in flowing air. The resulting first fired material contains about 0.48% Re. This first fired material is then wet ball milled for about 30 hours to a surface area of about 5.89 m$^2$/g. It is then re-fired for about 24 hours at about 900° C. in flowing air. The rhenium content of the resulting second fired material is about 0.11%.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering tungsten and rhenium from a tungsten and rhenium bearing source, said process comprising:
   (a) firing said source in an oxidizing atmosphere at a temperature of at least about 650° C. for a sufficient time to convert the tungsten and rhenium to their respective oxides, to remove a portion of the rhenium as volatilized oxide, and to form a first fired material containing essentially all of the tungsten and the remaining portion of the rhenium;
   (b) increasing the surface area of the resulting oxidized tungsten to appreciably above 0.5 m$^2$/g; and
   (c) firing said first fired material having increased surface area oxidized tungsten in an oxidizing atmosphere at a temperature of at least about 700° C. for a sufficient time to remove essentially all of said remaining portion of the rhenium as volatilized rhenium and to form an essentially rhenium-free oxidized tungsten.

2. A process of claim 1 wherein said source consists essentially of from about 1 to about 10 weight percent rhenium metal and the balance tungsten metal.

3. A process of claim 1 wherein said source is fired in an oxidizing atmsphere selected from the group consisting of air and oxygen.

4. A process of claim 1 wherein said first fired material is fired in an atmosphere selected from the group consisting of air and oxygen.

5. A process of claim 1 wherein said source is fired at a temperature of from about 650° C. to about 1100° C.

6. A process of claim 1 wherein said first fired material is fired at a temperature of from about 700° C. to about 1100° C.

7. A process of claim 1 wherein the surface area of said oxidized tungsten is increased to from about 7 to about 14 m$^2$/g.

8. A process of claim 1 wherein the surface area of said oxidized tungsten is increased to at least about 7 m$^2$/g.

* * * * *